Oct. 13, 1925. 1,557,478
F. LAMPLOUGH
APPARATUS FOR TREATMENT OF HYDROCARBON OIL VAPORS
Filed Nov. 22, 1923   2 Sheets-Sheet 2
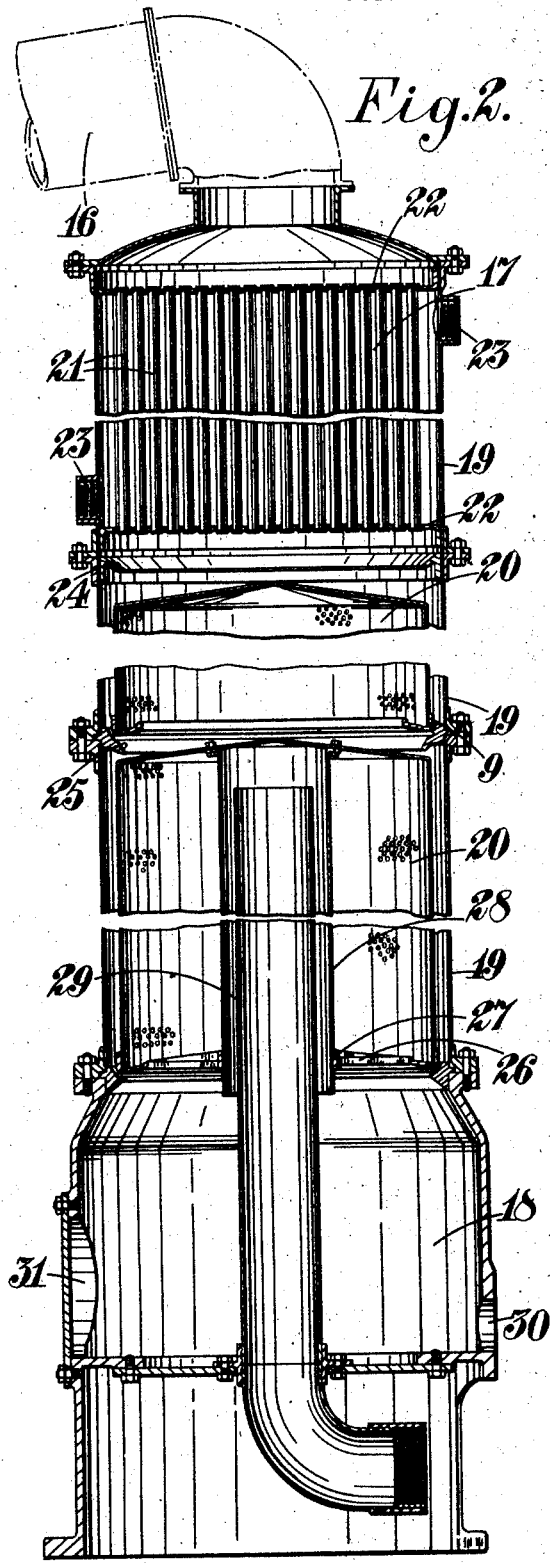
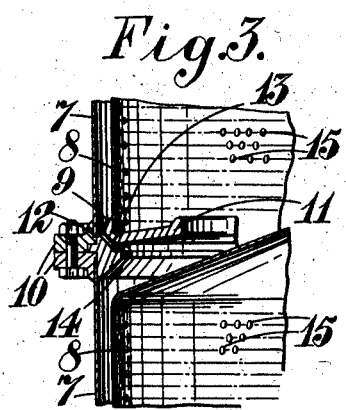
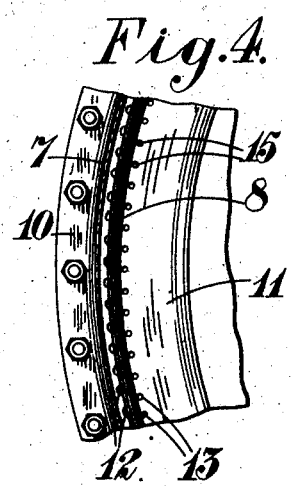

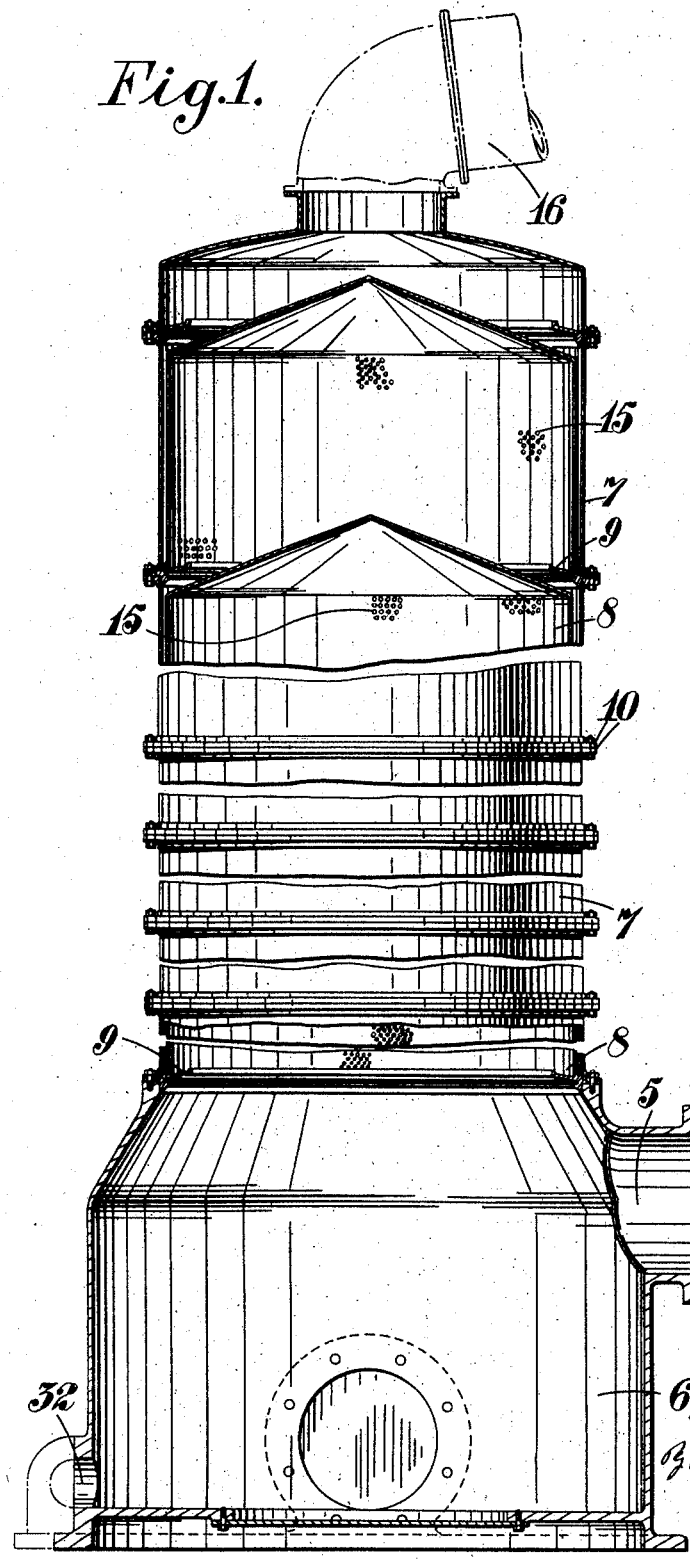

Patented Oct. 13, 1925.

1,557,478

UNITED STATES PATENT OFFICE.

FREDERICK LAMPLOUGH, OF HIGHFIELD, FELTHAM, ENGLAND, ASSIGNOR TO F. LAMPLOUGH & COMPANY, LIMITED, OF LONDON, ENGLAND, A BRITISH COMPANY.

APPARATUS FOR TREATMENT OF HYDROCARBON-OIL VAPORS.

Application filed November 22, 1923. Serial No. 676,269.

*To all whom it may concern:*

Be it known that I, FREDERICK LAMPLOUGH, a subject of the King of England, residing in Highfield, Feltham, Middlesex, England, have invented certain new and useful Improvements in Apparatus for Treatment of Hydrocarbon-Oil Vapors, of which the following is a specification.

This invention is for improvements in or relating to the treatment of hydrocarbon oil vapors and apparatus therefor.

When shale is distilled or oils are cracked the whole of the hydrocarbon content is in a highly superheated gaseous state and it has been found that in this condition if suddenly cooled a large proportion of the excess hydrogen-bearing gases escape leaving the carbon content behind, thus the resultant oil is heavily impregnated with unsaturated hydrocarbons. The loss of saturated compounds is high on account of a quantity of the very light carbon content, which comprises the most valuable oil fractions, being carried off with the escaping gases.

The main object of the present invention is to provide for the treatment of such hydrocarbon vapors in such manner as to increase the yield of saturated compounds.

According to this invention, therefore, apparatus for treating hydrocarbon vapors for the purpose specified, comprises, in combination, a cooling tower having a vapor inlet at the bottom and a vapor outlet at the top, means to direct the entering vapors laterally in a plurality of jets against an interior side wall of the tower, and means to constrain the condensate to gravitate down the tower on the aforesaid interior wall against which the uncondensed vapor is forced to impinge.

Preferably, a perforated cage is located within the tower and so arranged as to direct the entering vapors laterally in a plurality of jets against the interior walls of the tower. The walls of this case may be located adjacent to, but spaced from, the inside walls of the tower and the cage is preferably open at the top and closed at the bottom.

Preferably there is combined with a tower as above set forth a condenser communicating at one end with the top of said tower and at the other with a scrubber in the form of a chamber having within it one or more perforated walled bells on to which the condensate from the condenser is discharged, one of said bells being provided with a gas collecting and discharge device.

There will now be described by way of example and with the aid of the accompanying drawings a construction of apparatus according to this invention. This comprises what will be herein referred to as a "hot tower" and a "cold tower scrubber".

Figure 1 is a part central sectional elevation of the "hot tower";

Figure 2 is a central sectional elevation of the "cold tower scrubber";

Figure 3 is an enlarged detail sectional view of the weirs between the cages shown in Figure 1;

Figure 4 is a fragmentary plan of the part shown in Figure 3.

Like reference numerals refer to like parts in the several figures.

The hot vapors coming, for example from a shale retort, are led through a connection 5 into an expansion chamber 6 in the bottom of the hot tower (Figure 1) which is situated close to the retort and as the vapors leave the retort at a temperature of approximately 400–430° C., they will enter the expansion chamber at a temperature of about 400° C. This chamber 6 also acts as a separator for any water of condensation from the steam that is mixed with the vapors, the steam having been employed for the purpose of distilling the shale and bringing the vapors over. The heated vapors may act upon the undersurface of a baffle-plate (not shown) which may be located in the expansion chamber and help to vaporize any light oils that may condense on the upper surface of this plate. The tower is built up of cylindrical sections 7 and has a number of perforated cages 8 arranged one above the other within the tower-sections and supported at their lower ends by means of flanges 9 clamped between the flanges 10 which serve to secure the tower sections together. Each cage supporting flange 9 has a gutter portion 11 and is perforated all round at 12 and 13 to allow the condensed vapors that run down the inside of each tower-section and cage to percolate into an annular recess 14 below it which forms a weir over which the oil flows down the inside of the next under section of the tower.

This arrangement provides a moving sheet of oil on the inside of the tower and at the same time prevents any of the oil containing water to form an emulsion as it would do if allowed to fall direct down the tower. The sides of the cages 8 aforesaid are perforated with thousands of small holes (a few only being indicated in the drawings at 15) and as the vapors rise through the tower they enter the interior of each cage and pass through the said holes in each section of the tower in succession and impinge upon the descending sheet of oil; the conical tops of the cages are closed. Thus, in working their way through the cages the vapors are progressively cooled and as the jets issuing through the perforations strike upon the sheet of descending oil on the inside of the air-cooled tower with some force, the vapor is intimately mixed with the oil at the points of contact. The temperature is falling all the time and a very complete absorption takes place and saturated crude oil results and from a specific amount of shale it is found that a much larger yield of oil is obtained.

A connection 16 from the top of the hot tower is taken to a water-cooled condenser 17 at the top of the cold tower (Figure 2) and any uncondensed vapor from the hot tower is thus led direct to the condenser. The cold tower is similar in construction to the hot tower already described. It comprises a base chamber 18 which supports four tower-sections 19 (in the drawing one section is omitted) in the top one of which the condenser 17 is located and in each of the others a perforated sided cage 20 is supported in a manner similar to that described in connection with the hot tower.

The condenser comprises a batch of tubes 21 secured in tube plates 22 which form the top and bottom walls of the top tower-section. Water circulating pipe connections are shown at 23. Round the top of the next section below the condenser a down-turned flange 24 is secured which serves to direct the condensate from the outer tubes on to the domed top of the cage 20 below. The flanges for supporting the two upper cages are similar to the flanges 9 of the hot tower except that the annular recess 14 is provided with an inwardly directed lip 25 which directs the oil on to the top of the next cage below, while the supporting flange for the lowermost cage is provided with an outwardly directed lip to the recess as in the hot tower construction. This bottom supporting flange is in the form of a spider, the arms 26 of which carry a central boss 27 which supports the lower end of a tube 28 secured at its upper end to the top of the cage. This tube is a sliding fit in the boss. A tube 29 of smaller diameter is secured to the base of the base chamber 18 and extends upwards through the tube 28 to a point near the top of the cage. The lower end of this tube may communicate with a suction plant. The chamber 18 is provided with an outlet 30 for condensed products and a manhole or door 31 for cleaning purposes.

The condensate from the condenser together with any vapors left, flows on to the domed top of the uppermost cage and is subjected to scrubbing action in passing through the small holes in the periphery of each of the cages until finally the oil enters the receiver or base chamber 18 around the edge thereof over the weir formed by the outwardly directed lip of the lowermost cage supporting flange. Thus the liquid portion of the vapor content flowing over the cages and down the perforated walls passes through the holes scrubbing the light vapors which are absorbed by the oil and descends into the receiver. Any air or carbon dioxide passes up through the bottom of the aforesaid tube 28, rises through the same and finally enters the central tube 29 through which it passes direct into the air, or it may be drawn away by a suction plant.

The oil and water from the hot tower pass out by a connection 32 to settling and separating tanks where they are separated in the usual manner by gravity. Naphtha leaves the cooling tower by the connection at the base of the receiver and also passes to a settling and separating tank. Any gas that may be made during the operation makes its escape through the central tube aforesaid. If the process is carried out properly little or no gas is made and this no doubt accounts for the extra yield of oil and spirit. For example, when treating South African torbanite 150 gallons of oil to the ton of shale have been produced which contain 8 gallons of petrol of .730 specific gravity.

In a modified form of hot tower or hydro-generating tower intended for small plants and laboratory purposes, instead of being in sections a single outer tube for the tower is used and the cages are pushed into it, each cage being provided at the bottom with a packing ring constituted for example, by a channel piece secured around the base and containing within the channel asbestos or like packing which bears on the interior of the tube. The periphery of each cage is perforated in a similar manner to the cages in the larger tower hereinbefore described and the cages are kept centralized by a funnel-shaped cone fitted to the bottom of each cage engaging the coned top of the cage below. The inner edge of each funnel-shaped cone is serrated to allow the oil to flow downwards over the coned top of the next cage and at the same time the cages hold each other centrally, the top cage being centralized by means of a perforated plate secured within the tube and the whole set of cages being supported at the bottom by a ring plate bolted between the flanges of the bottom cover and receiver of the tower. In the base of the tower is a coiled pipe through which the vapors pass from the shale retort, the heat of which vaporizes any light oils or water that may lodge in the bottom of the tower and serves the same purpose as a baffle-plate hereinbefore referred to. The base of the tower is also provided with a connection through which the condensate may be drawn off when desired. With this apparatus, a similar type of cold tower scrubber would also be employed. The condenser in either case comprises a number of vertical tubes arranged between two plates within a chamber through which cooling water is circulated, the lower tube plate being supported on top of the tower tube.

In a particular example, taking Scotch shale yielding by the Scotch method of distillation 25 gallons of oil to the ton by the combined system of retorting and treating the vapors as described, there has been obtained from the same class of shale 40–50 gallons of oil to the ton, and furthermore whereas the oil obtained by the Scotch method contains up to 30% of unsaturated compounds, the oil treated by the present system only contains from 5 to 10% and even this should be eliminated by using a series of hot towers for the purpose of obtaining a perfect assimilation of the vapors. Only one hot tower has been described but it is obvious that a series of these towers may be used completely to deal with the vapors, in fact, it is necessary that a number of towers should be used in proportion to the amount of vapor passing over, it being essential that the vapors leaving the hot tower should be lowered in temperature to between 150–200° C., otherwise their sudden cooling would cause loss of the hydrogen content—as when the vapors leave the last hot tower they pass direct into the water-cooled condenser where they are subjected to rapid cooling.

I claim:

1. Apparatus for treating hydrocarbon vapors for the purpose specified, comprising in combination a cooling tower having a vapor inlet at the bottom and a vapor outlet at the top, means to direct the entering vapors laterally in a plurality of jets against an interior side wall of the tower, and means to constrain the condensate to gravitate down the tower on the aforesaid interior wall against which the uncondensed vapor is forced to impinge.

2. Apparatus for treating hydrocarbon vapors for the purpose specified, comprising in combination a cooling tower having a vapor inlet at the bottom and a vapor outlet at the top, a perforated cage located within the tower and so arranged as to direct the entering vapors laterally in a plurality of jets against the interior walls of the tower, and means to collect the condensate and to constrain it to gravite down the aforesaid walls against which the ascending vapors are directed.

3. Apparatus for treating hydrocarbon vapors obtained from the heat treatment of oil bearing material which apparatus comprises in combination a tower, a cage located within said tower and having a closed top and perforated side walls which walls are adjacent to but spaced from the inside walls of the tower, means to direct the vapor to be treated into the interior of said cage, means within the tower to collect the vapor condensed therein and to direct such condensate in a moving curtain down the interior side walls of the tower, an outlet for uncondensed vapor at the upper end of the tower and an outlet for the condensate at the lower end of the tower.

4. Apparatus for treating hydrocarbon vapors obtained from the heat treatment of oil bearing material which apparatus comprises in a combination a tower, a plurality of similarly shaped cages open at the bottom, closed at the top and having perforated side walls, said cages being arranged one above the other within the tower aforesaid, means to direct the vapor to be treated into the lowermost cage through the perforations in said cage against the adjacent inside walls of the tower thence into the interior of the next uppermost cage and so on in succession to the top of the tower, means to collect vapor condensed within each section of the tower and to direct such condensate in a curtain down the inside walls of the tower, an outlet for uncondensed vapor at the top of the tower and an outlet for condensate at the lower end of the tower.

5. Apparatus for treating hydrocarbon vapors for the purpose specified comprising in combination a tower, a cage located within said tower and having a closed top and perforated side walls which walls are adjacent to but spaced apart from the inside walls of the tower, means to direct the vapor to be treated into the interior of the cage, an annular trough-like member situated near the upper end of the cage and formed to collect the vapor condensed within the tower, and to pass the condensate on to the exterior walls of the cage, an outlet for uncondensed vapor at the upper end of the tower and an outlet for the condensate at the lower end of the tower.

6. Apparatus for treating hydrocarbon vapors for the purpose specified comprising in combination a tower, a cage located within said tower and having a closed top and perforated side walls which walls are adjacent to but spaced apart from the inside walls of the tower, means to direct the vapor to be treated into the interior of the cage, an annular trough-like member situated near the upper end of the cage and formed to collect the vapor condensed within the tower, conduits extending through the trough-like member from top to bottom thereof, a weir situated below the trough-like member to receive the condensate from the conduits therein and shaped to direct said condensate on to the exterior walls of the cage, an outlet for uncondensed vapor at the upper end of the tower and an outlet for the condensate at the lower end of the tower.

7. Apparatus for treating hydrocarbon vapors obtained from the heat treatment of oil-bearing material which apparatus comprises in combination a tower having a vapor inlet at the bottom, a vapor exit at the top and an outlet for condensed vapor at the lower end of the tower, a plurality of annular edges inwardly extending from the side walls of the tower and spaced apart one above the other, a plurality of cages open at the bottom, closed at the top and having perforated side walls, each of said cages being supported upon one of the annular ledges aforesaid and each cage having its side walls adjacent to but spaced from the adjacent inside walls of the tower, and a weir situated below each of the annular ledges aforesaid and communicating by throughway passages in the corresponding ledge with the interior of the cage supported by said ledge and with the space between said cage and the adjacent side walls of the tower, said weirs being so shaped as to direct liquid flowing over them on to the inside walls of the tower below the weirs.

In testimony whereof I affix my signature.

FREDERICK LAMPLOUGH.